(12) United States Patent
Bazin et al.

(10) Patent No.: US 12,364,962 B2
(45) Date of Patent: Jul. 22, 2025

(54) PHOTOCHEMISTRY DEVICE WITH A PLURALITY OF UV AND VISIBLE LIGHT SOURCES THAT CARRY OUT PHOTOCATALYTIC REACTIONS

(71) Applicant: HEPATOCHEM INC., Beverly, MA (US)

(72) Inventors: Marc J. Bazin, Beverly, MA (US); Ryan S. Buzdygon, Beverly, MA (US)

(73) Assignee: HEPATOCHEM INC., Beverly, MA (US)

( * ) Notice: Subject to any disclaimer, the term of this patent is extended or adjusted under 35 U.S.C. 154(b) by 0 days.

(21) Appl. No.: 18/637,378

(22) Filed: Apr. 16, 2024

(65) Prior Publication Data

US 2024/0316524 A1    Sep. 26, 2024

Related U.S. Application Data

(63) Continuation of application No. 17/096,282, filed on Nov. 12, 2020, now Pat. No. 11,992,819.
(Continued)

(51) Int. Cl.
| | |
|---|---|
| *B01J 19/08* | (2006.01) |
| *B01J 19/18* | (2006.01) |
| *G01N 21/33* | (2006.01) |

(52) U.S. Cl.
CPC ............... *B01J 19/08* (2013.01); *B01J 19/18* (2013.01); *B01J 2219/00074* (2013.01); *B01J 2219/08* (2013.01); *G01N 21/33* (2013.01)

(58) Field of Classification Search
CPC .. B01J 19/08; B01J 19/18; B01J 2219/00074; B01J 2219/08; B01J 19/121; B01J 2219/00135; B01J 2219/0875; B01J 2219/0236; B01J 2219/0209; B01J 2219/00099; B01J 2219/0254; B01J 2219/1266; B01J 2219/0871; B01J 2219/0277; B01J 19/128; B01J 19/0013;
(Continued)

(56) References Cited

U.S. PATENT DOCUMENTS

| | | |
|---|---|---|
| 3,786,250 A | 1/1974 | Huhn |
| 4,456,512 A | 6/1984 | Bieler et al. |

(Continued)

FOREIGN PATENT DOCUMENTS

| | | |
|---|---|---|
| CN | 101065154 A | 10/2007 |
| CN | 105251426 A | 1/2016 |

(Continued)

OTHER PUBLICATIONS

"International Search Report and Written Opinion received for PCT Patent Application No. PCT/US2020/063333, mailed May 7, 2021", 11 pages.
(Continued)

*Primary Examiner* — Xiuyu Tai
(74) *Attorney, Agent, or Firm* — Adler Pollock & Sheehan P.C.; Michel Morency

(57) ABSTRACT

A device includes an insulated reaction chamber, light sources above a stirring module, the light sources surrounding the reaction chamber, and holders containing reaction vessels, the holders configured to fit within the insulated reaction chamber in a manner that enables an even distribution of light between the reaction vessels.

15 Claims, 12 Drawing Sheets

Related U.S. Application Data

(60) Provisional application No. 62/922,232, filed on Nov. 13, 2019.

(58) Field of Classification Search
CPC .. B01J 19/0046; B01J 19/123; B01J 19/0066; B01J 2219/1203; B01J 2219/00704; B01J 2219/0877; B01J 2219/00481; B01J 2219/00308; B01J 2219/0892; B01J 2219/00495; G01N 21/33; G02B 5/10; G02B 5/0808; C07D 401/12; C07D 493/04; C12Q 1/6848; C12Q 2523/101; C12Q 2521/531; G11C 11/412; B01L 7/00; B01L 7/52; H10B 10/00; B01D 59/34; Y10S 204/902
See application file for complete search history.

(56) References Cited

U.S. PATENT DOCUMENTS

| | | |
|---|---|---|
| 4,517,063 A | 5/1985 | Cirjak |
| 5,184,020 A | 2/1993 | Hearst et al. |
| 5,288,684 A | 2/1994 | Yamazaki et al. |
| 2011/0309032 A1 | 12/2011 | Maeki |
| 2013/0295663 A1 | 11/2013 | Weight et al. |
| 2016/0064758 A1 | 3/2016 | Lalman et al. |
| 2019/0040345 A1 | 2/2019 | Viljoen |
| 2019/0270065 A1 | 9/2019 | Bazin et al. |
| 2020/0406224 A1 | 12/2020 | Thompson et al. |

FOREIGN PATENT DOCUMENTS

| | | |
|---|---|---|
| CN | 105344299 A | 2/2016 |
| CN | 208170778 U | 11/2018 |
| CN | 208465858 U | 2/2019 |
| CN | 109996603 A | 7/2019 |
| CN | 209237909 U | 8/2019 |
| CZ | 27242 U1 | 8/2014 |
| EP | 3409352 A1 | 12/2018 |
| JP | S49108847 U | 9/1974 |
| JP | S52167451 U | 12/1977 |
| JP | H07124271 A | 5/1995 |
| JP | 2006519003 A | 8/2006 |
| JP | 2018167195 A | 11/2018 |
| KR | 20120029763 A | 3/2012 |
| WO | 9106843 A1 | 5/1991 |
| WO | 2011057015 A2 | 5/2011 |
| WO | 2016027265 A1 | 2/2016 |
| WO | 2018098189 A1 | 5/2018 |
| WO | WO 2018/098189 * | 5/2018 |

OTHER PUBLICATIONS

Partial Supplementary European Search Report received for EP Application No. 20887160.8, mailed on Oct. 21, 2024, 10 pages.
Extended European Search Report received for EP Application No. 20887160.8, mailed on Jan. 13, 2025, 9 pages.

* cited by examiner

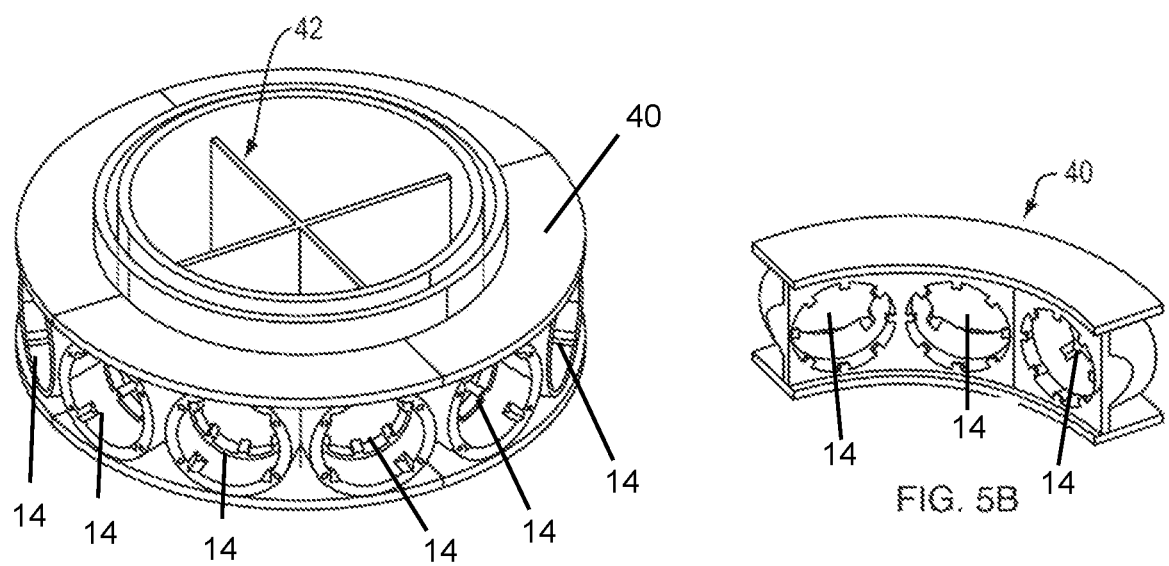
FIG. 5A
FIG. 5B
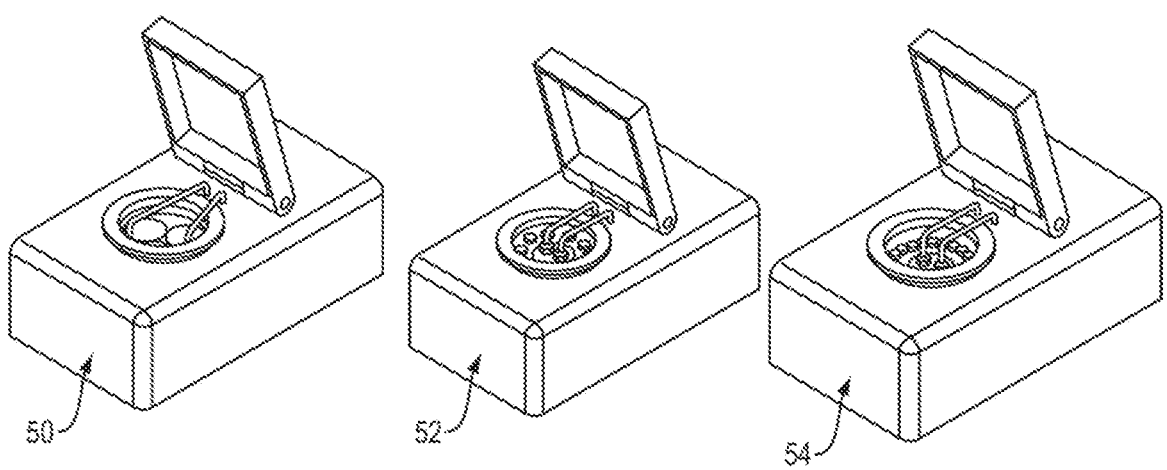
FIG. 6

PHOTOCHEMISTRY DEVICE WITH A PLURALITY OF UV AND VISIBLE LIGHT SOURCES THAT CARRY OUT PHOTOCATALYTIC REACTIONS

CROSS REFERENCE TO RELATED APPLICATIONS

The present application is a Continuation of U.S. application Ser. No. 17/096,282 filed Nov. 12, 2020, which claims the benefit under 35 USC § 119 (a) to U.S. Provisional Patent Application Ser. No. 62/922,232, filed Nov. 13, 2019. The disclosure of each of the prior applications is considered part of, and is incorporated by reference, in the disclosure of this application.

BACKGROUND OF THE INVENTION

The present invention relates generally to photochemistry and specifically to a photochemistry device.

In general, photochemistry involves chemical reactions that are initiated by light. In order to photoreact, a molecule must absorb light energy. The molecules absorb light in the visible and ultraviolet region. This light energy causes molecules to photoreact to form other molecules. In order to determine where a molecule absorbs light, an absorption spectrum can be taken. Peaks in the spectrum correspond to light energy that excites the molecule and causes it to react.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a device including an insulated reaction chamber, light sources above a stirring module, the light sources surrounding the reaction chamber, and holders containing reaction vessels, the holders configured to fit within the insulated reaction chamber in a manner that enables an even distribution of light between the reaction vessels.

In another aspect, the invention features a system including a photoreactor having an inlet and an outlet to enable introduction of a thermostatic fluid into an insulated reaction chamber, a reservoir of thermostatic fluid, a heat exchanger, and a heater/chiller unit, the reservoir of liquid linked to the photoreactor and the heat exchanger, the heat exchanger linked to the heater/chiller unit.

Embodiments of the invention may include one or more of the following advantages.

The present invention includes liquid temperature management, multi-vial/multi-format holders, magnetic stirring capability and modular light sources for homogeneous light distribution between reaction vials.

The present invention can use special vial cover/caps that impeach light to leak from the reaction chamber while allowing reaction sampling.

The present invention facilitates the survey and scale-up of photo chemical reactions.

Light sources can be controlled independently to allow a homogeneous exposure to the radiation and therefore adapt to the type and number of reaction vessels inserted in the reaction chamber.

The wavelength of light sources can be different allowing a screen of wavelengths in the reaction chamber.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIGS. 5A and 5B illustrate light sources.

FIG. 6 illustrates exemplary holder configurations.

DETAILED DESCRIPTION

Figure 1:
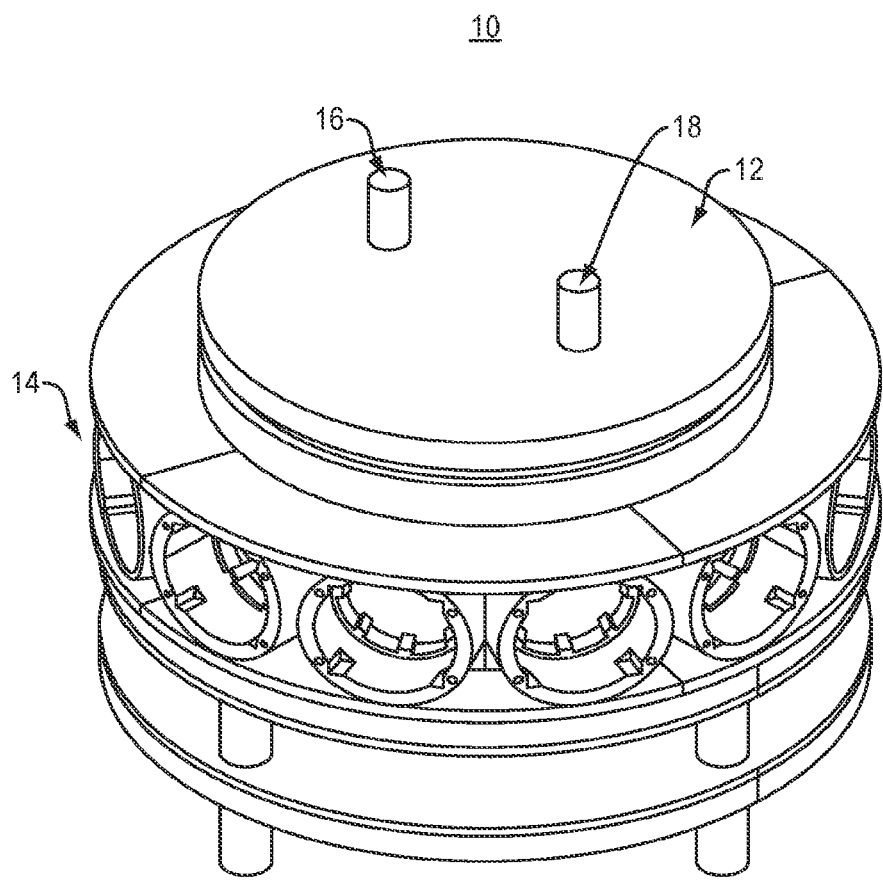
FIG. 1 illustrates an exemplary device.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Embodiments of the present invention provide a device to facilitate photochemical reactions and limit or prevent unwanted factors from affecting the photochemical reactions. The device can include an insulated reaction chamber, light sources surrounding the reaction chamber above a stirring module, the light sources surrounding the reaction chamber, and holders containing reaction vessels configured to fit within the insulated reaction chamber in a manner that enables an even distribution of light between the reaction vessels.

As shown in FIG. 1, an exemplary device 10 in accordance with the principles of the present invention includes a reaction chamber 12 surrounded by light sources 14. The reaction chamber 12 is insulated to facilitate temperature control and may include an inlet 16 and an outlet 18 to enable introduction of a thermostatic fluid.

Figure 2:
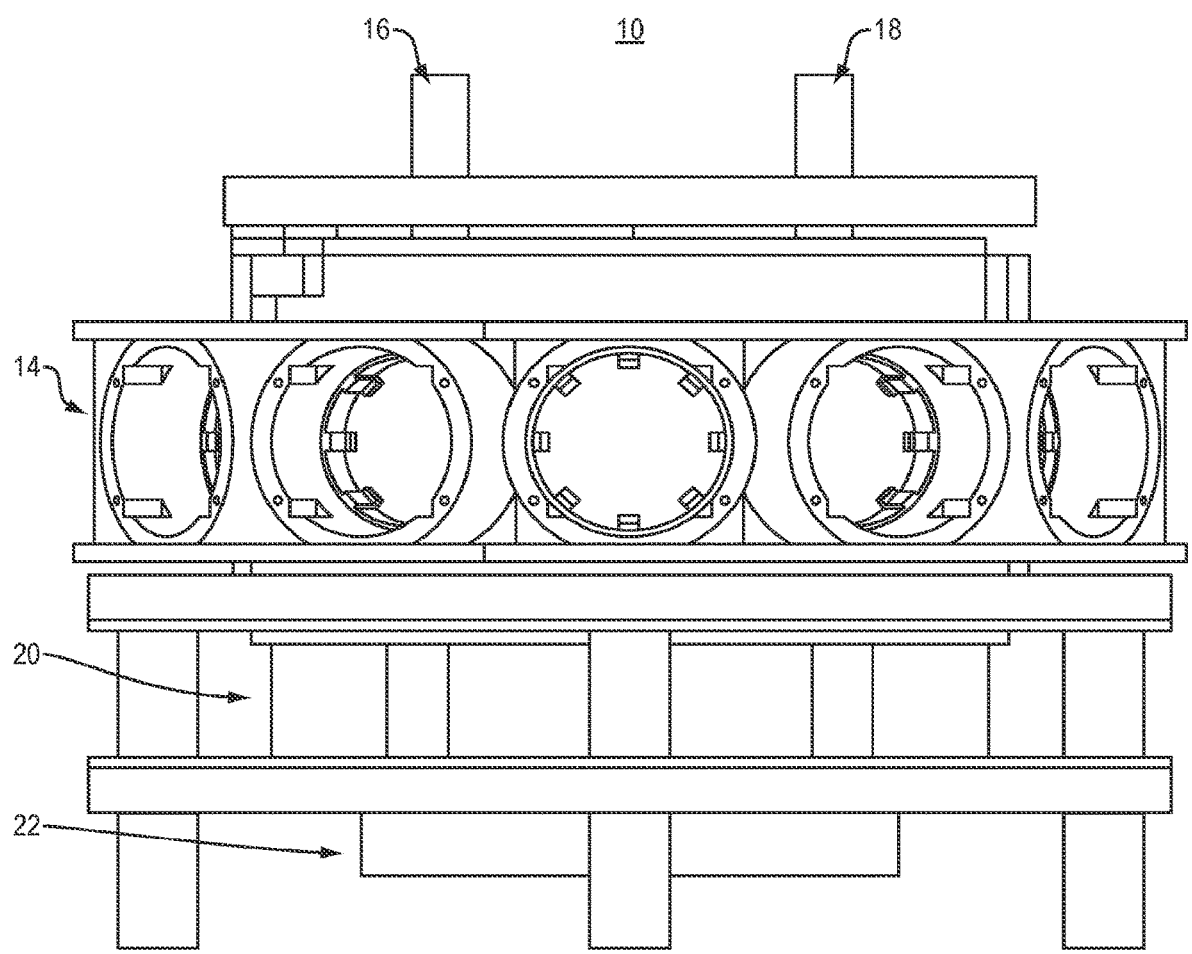
FIG. 2 illustrates a side view of the exemplary device of FIG. 1.

As shown in FIG. 2, a side view of the exemplary device 10 shows light sources 14, liquid reservoir 20 and a magnetic stirring module 22.

Figure 3:
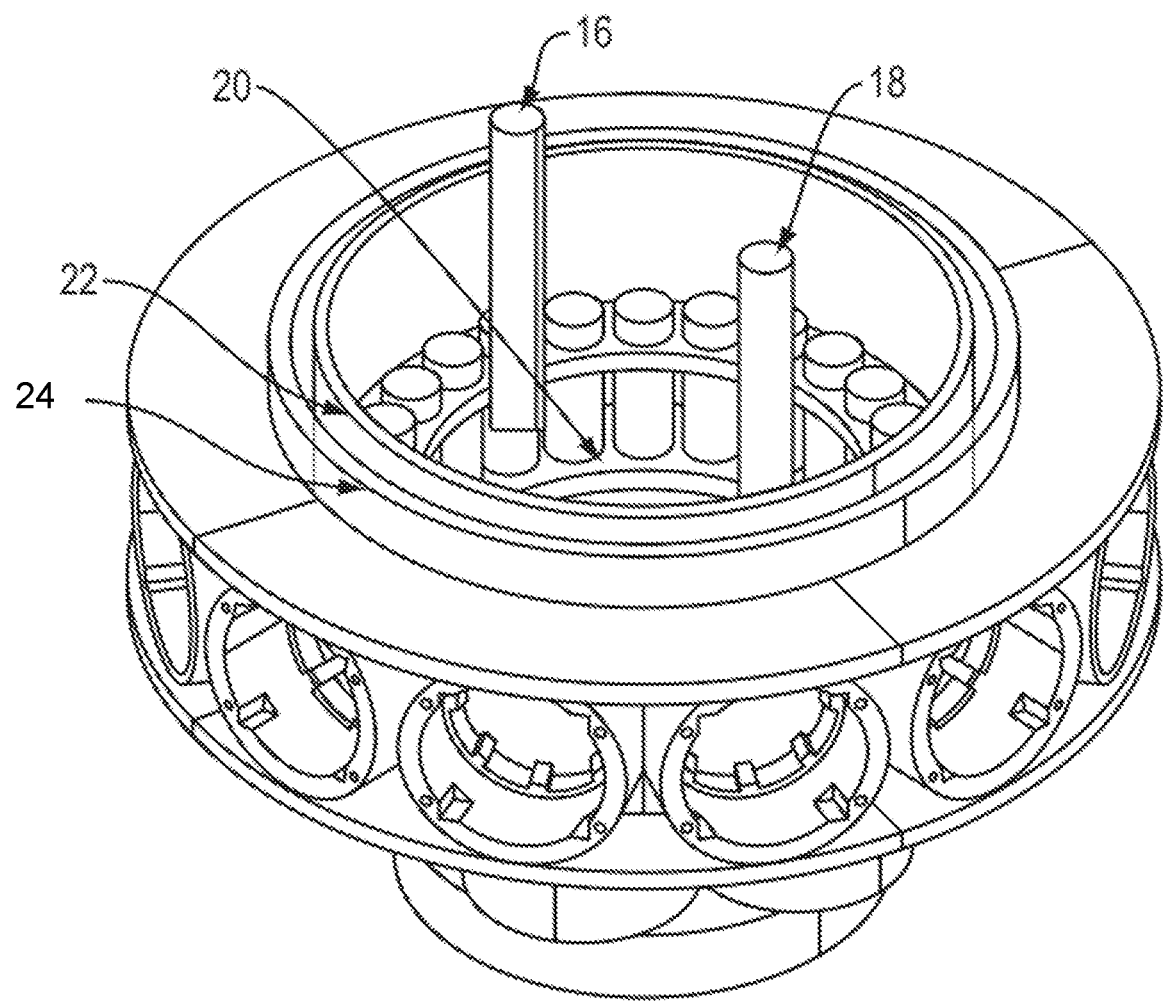
FIG. 3 illustrates a reaction chamber.

As shown in FIG. 3, the exemplary device 10 illustrates that the reaction chamber may be thermoregulated with a circulation of a liquid at liquid reservoir 20. Here, the reaction chamber is separated from the light sources 14 by a double wall 22, and 24 which enables light transmission and thermo insulation.

Figure 4A:
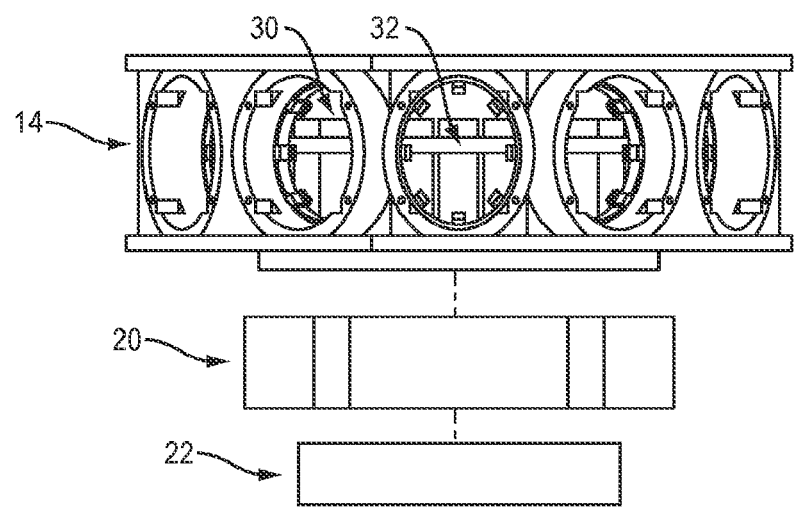
FIGS. 4A and 4B illustrate a holder.
Figure 4B:
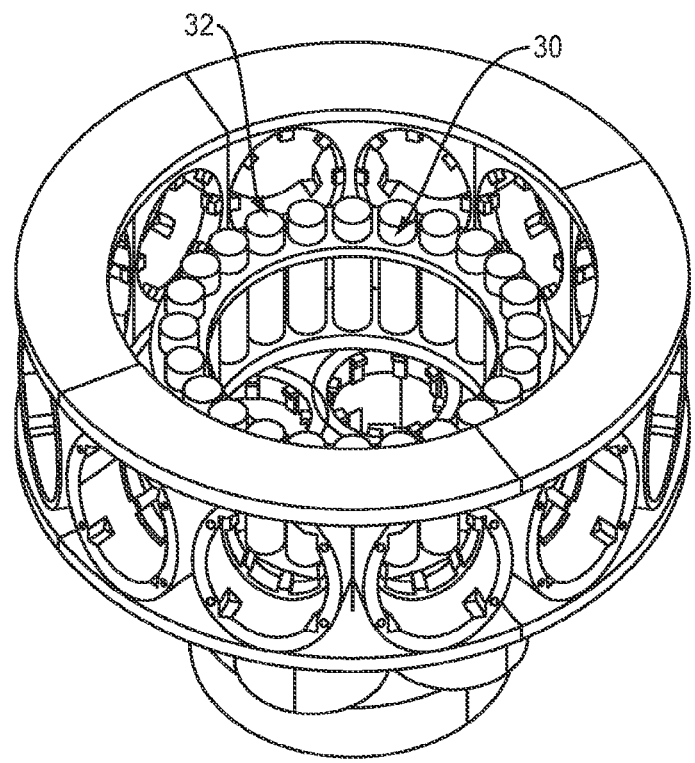

As shown in FIG. 4A and in FIG. 4B, one or more reaction vessels 30 are placed into a holder 32 in the reaction chamber. The one or more reaction vessels 30 are maintained in position in the holder 32.

In FIG. 5A and in FIG. 5B, the light sources 14 may be controlled independently to adapt a light irradiation to a type and a number of reaction vessels (not shown) inserted in the holder (not shown) in the reaction chamber. In one embodiment, the light sources 14 are modular 40 in nature (FIG. 5B). Thus, a series of modular light sources may be configured to surround the reaction chamber and be contained within the reaction chamber using one or more separation walls 42 (FIG. 5A). In this embodiment, each light source module 40 can have different wavelengths enabling different wavelengths in the reaction chamber using the separation wall 42.

The holder 32, which are removable, may be configured in a variety of sizes to accommodate any number of reaction vessels. In FIG. 6, three exemplary holder configurations 50, 52, 54 are illustrated. More specifically, holder 50 illustrates a configuration adapted to secure three 200 ml reaction vessels, holder 52 illustrates a configuration adapted to secure ten 20 ml reaction vessels and holder 55 illustrates a configuration adapted to secure twenty-four 4 ml reaction vessels. Other holder configurations may be employed to meet a specific scientific need.

Figure 7A:
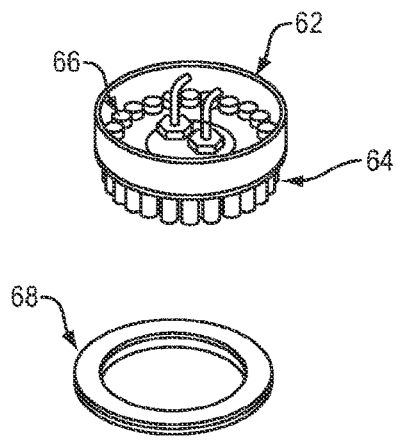
FIGS. 7A-7D illustrate an exemplary holder.

As shown in FIG. 7A, in general, each holder 60 includes a wall 62 that blocks the light coming from the side of a reactor chamber above the reaction vessels 64. Each reaction vessel 64 includes a cap 66 that leans on the holder 60 and blocks light leakage from a bottom of the reaction vessel 64. In addition, a gasket 68 is positioned on a top edge of the reaction vessel to avoid light leakage coming from the reactor vessel 64.

Figure 7B:
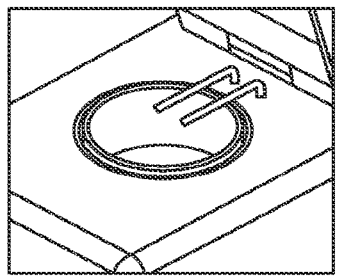
Figure 7C:
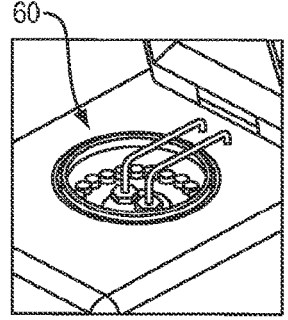
Figure 7D:
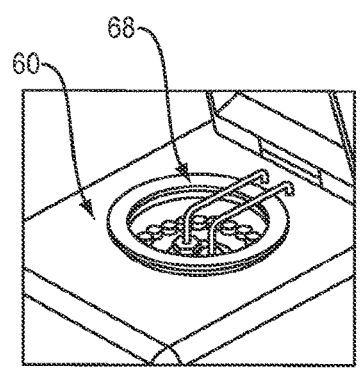

FIG. 7B illustrates an empty reaction chamber. FIG. 7C illustrates the holder 60 positioned within the reaction chamber and FIG. 7D illustrates placement of the gasket 68 on a top edge of the reaction chamber over the holder 60.

Figure 8:
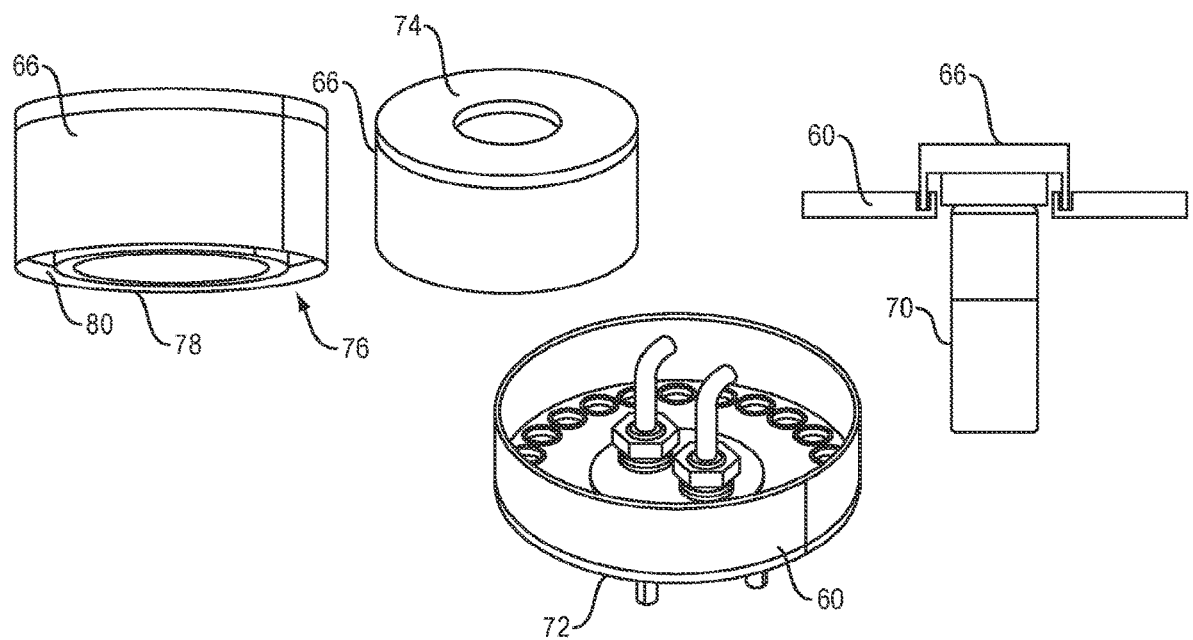
FIG. 8 illustrates an exemplary cap.

As shown in FIG. 8, each reaction vessel 70 includes a cap 66 that leans on the holder 60 and blocks light leakage from a bottom of the reaction vessel 72. The cap 66 includes a top portion 74 having a central circular membrane. The cap 66 includes an inner wall 78 and an outer wall 80. The inner wall 78 of the cap 66 secures directly to the reaction vessel 70 while the outer wall 80 of the cap 66 leans on the holder 60 and blocks light leakage. The inner wall 78 may be secured to the reaction vessel 70 in a variety of ways, such as, for example, a configuration having threads matching opposing threads on the reaction vessel 70, a press fit configuration, and so forth.

Figure 9:
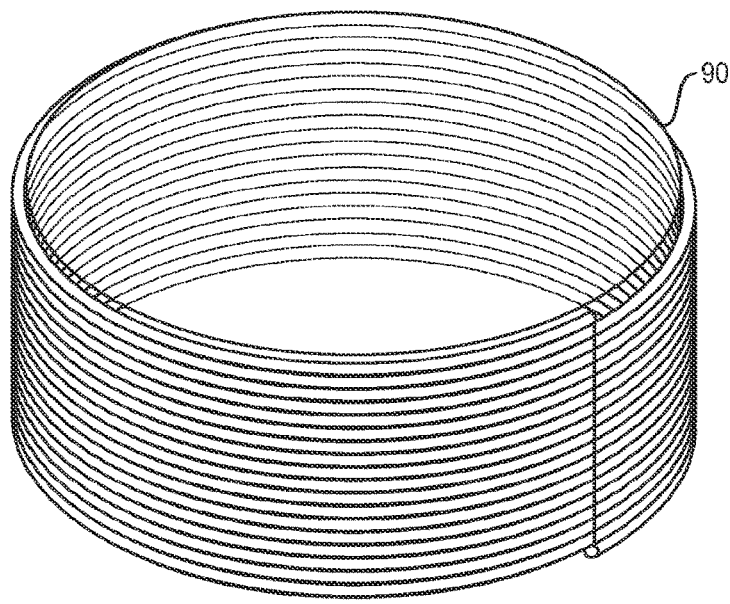
FIG. 9 illustrates a reaction vessel of transparent tubing.

As shown in FIG. 9, a reaction vessel 90 be made out of transparent tubing enabling flow chemistry reaction setup.

Figure 10A:
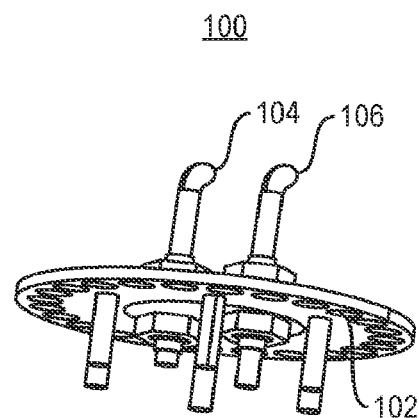
FIGS. 10A, 10B and 10C illustrate different views of an exemplary holder.
Figure 10B:
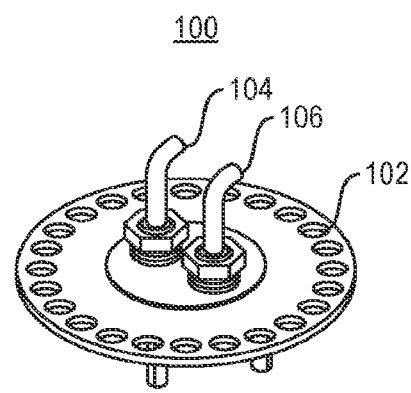
Figure 10C:
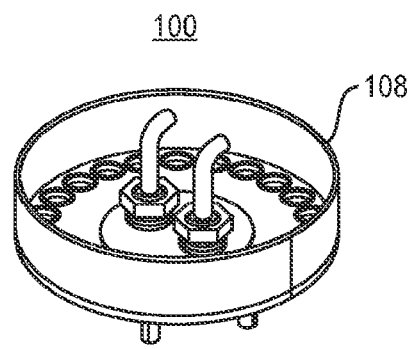

FIGS. 10A, 10B and 10C illustrate different views of an exemplary holder 100. In FIGS. 10A and 10B, the holder 100 includes a generally circular perforated reaction vessel carousel 102, a liquid inlet 104 and a liquid outlet 106. In FIG. 10C, the holder 100 is shown with a perimeter wall 108.

Figure 11A:
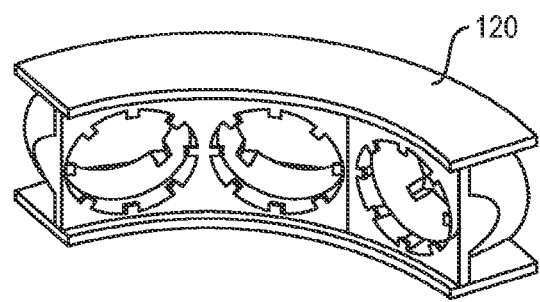
FIGS. 11A and 11B illustrate exemplary modular light sources.
Figure 11B:
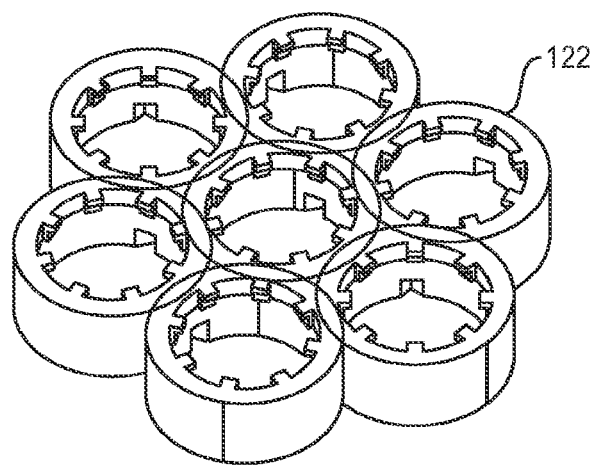

As described above, the lights sources may be modular. In FIG. 11A, a light source module 120 includes three lateral light sources. In FIG. 11B, a bottom light source module 122 includes seven light sources.

Figure 12:
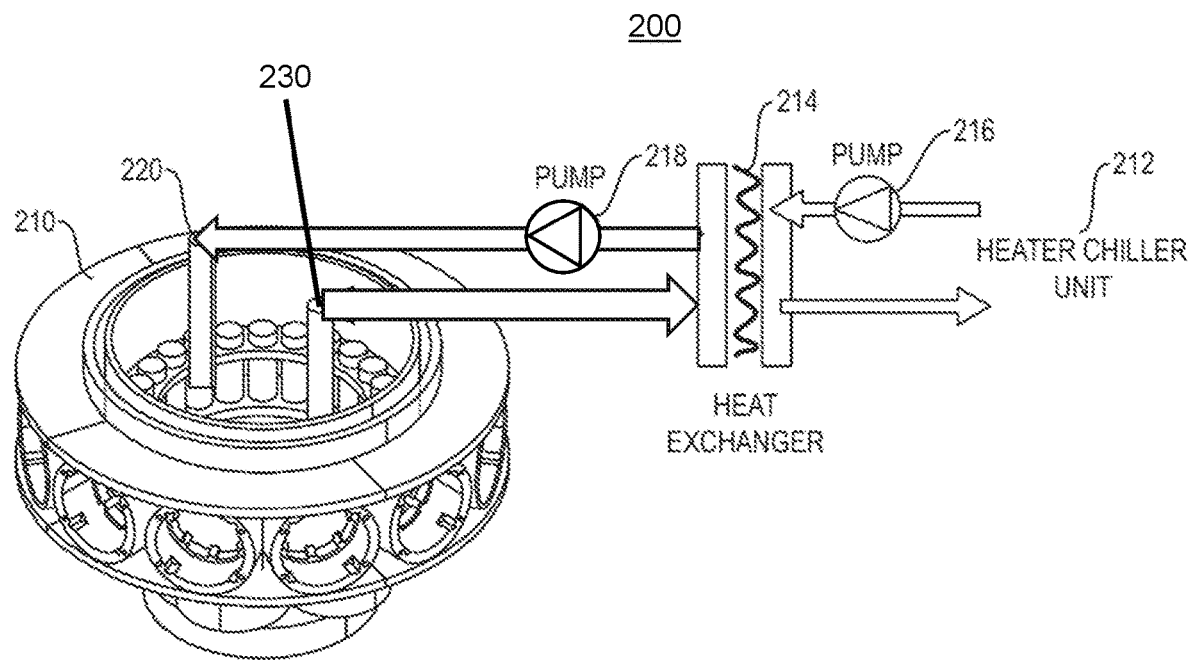
FIG. 12 illustrates a first exemplary photochemistry system.

As shown in FIG. 12, a first exemplary photochemistry system 200 includes a photochemical device 210 linked to a heater chiller unit 212 through a heat exchanger 214. More specifically, a first pump 216 delivers a fluid from the heater chiller unit 212 to the heat exchanger 214. A second pump 218 delivers fluid from the heat exchanger 214 to an inlet 220 on the photochemical device 210. Fluid leaving the photochemical device 210 exits from an outlet 230 to the heat exchanger 214 and back to the heater chiller unit 212.

Figure 13:
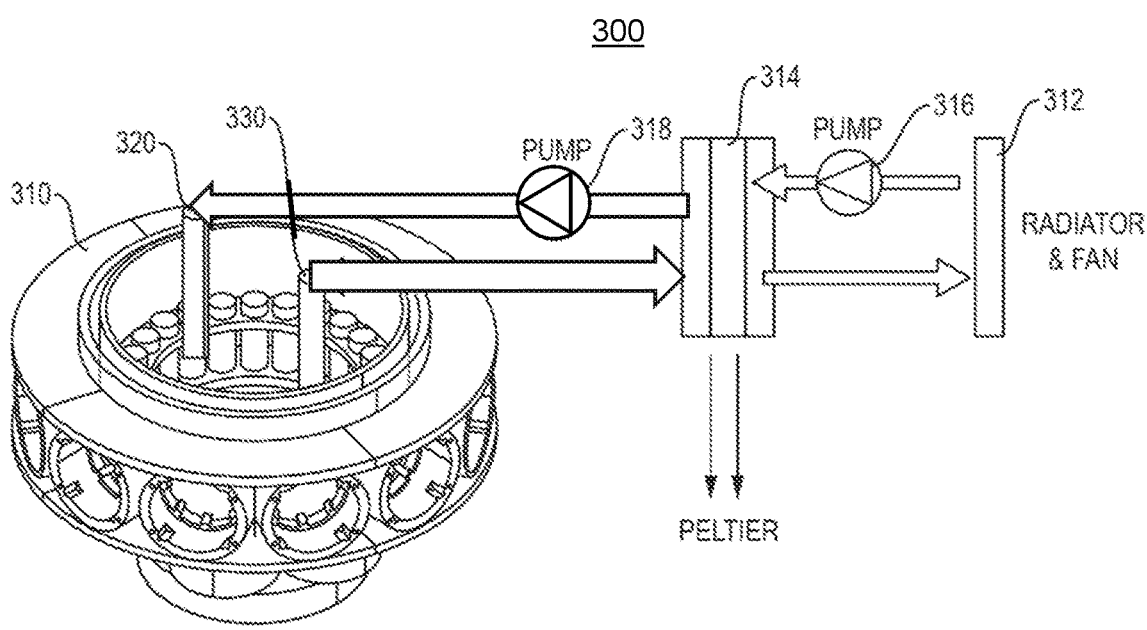
FIG. 13 illustrates a second exemplary photochemistry system.

As shown in FIG. 13, a second exemplary photochemistry system 300 includes a photochemical device 310 linked to a radiator and fan unit 312 through a thermoelectric heat pump 314. More specifically, a first pump 316 delivers a liquid fluid from the radiator and fan unit 312 to the thermoelectric heat pump 314. A second pump 318 delivers fluid from the thermoelectric heat pump 314 to an inlet 320 on the photochemical device 310. Fluid leaving the photochemical device 310 exits from an outlet 330 to the thermoelectric heat pump 314 and back to the radiator and fan unit 312.

Figure 14:
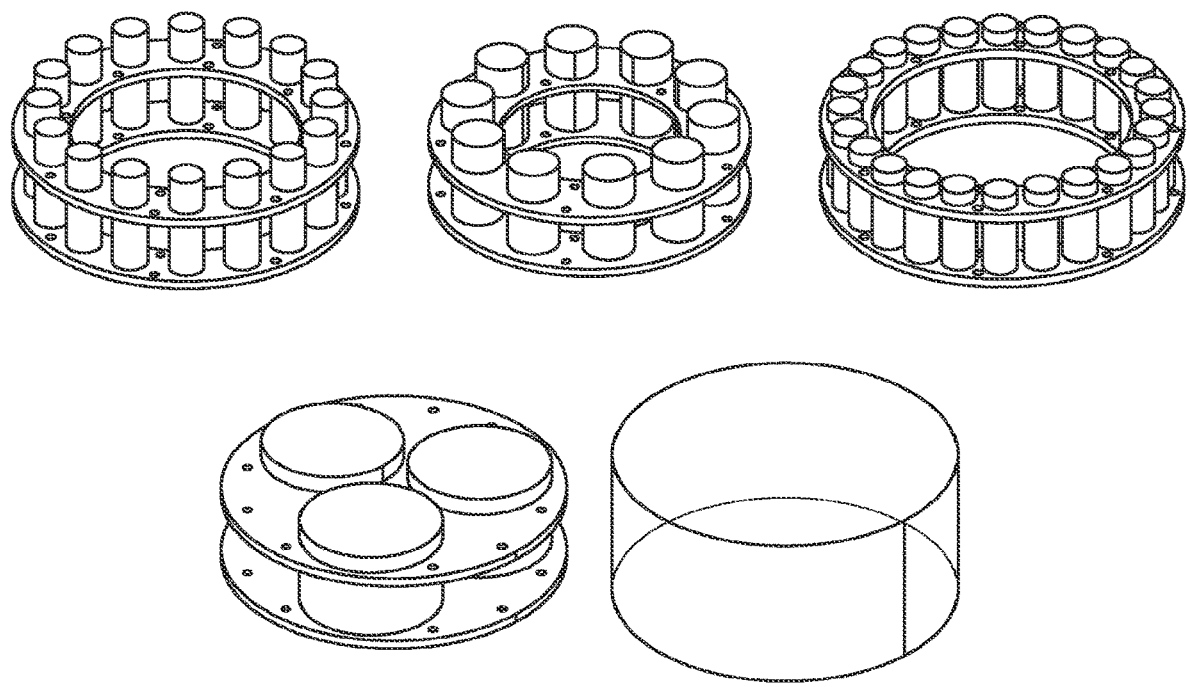
FIG. 14 illustrates a variety of reaction holder configurations.

FIG. 14 illustrates a variety of reaction holder configurations.

Figure 15:
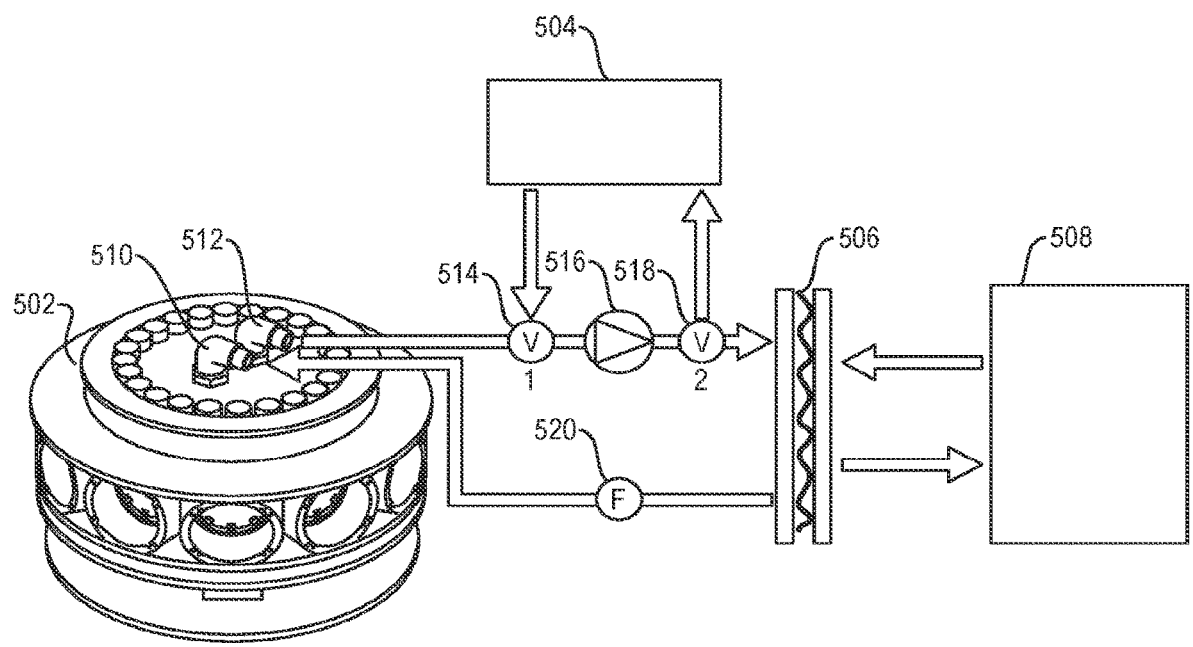
FIG. 15 is a block diagram of an exemplary photochemistry system.

As shown in FIG. 15, an exemplary 500 system includes a photoreactor 502, a reservoir 504 of thermostatic fluid, a heat exchanger 506 and a heater/chiller unit 508. The photoreactor 502 includes an inlet 510 and an outlet 512 to enable introduction of a thermostatic fluid into the photoreactor 502.

As described in detail above, the photoreactor 502 includes light sources above a stirring module that surround an insulated reaction chamber, and holders containing reaction vessels. The holders are configured to fit within the insulated reaction chamber in a manner that enables an even distribution of light between the reaction vessels. In one embodiment, each of the light sources is independently controllable.

The outlet 512 of the photoreactor 502 is linked to a first three-way valve 514 that is linked to a pump 516 and the reservoir 504 of thermostatic fluid. The first three-way valve 514 is configured to empty the reservoir 504 of thermostatic fluid or the insulated reaction chamber of the photoreactor 502.

The pump 516 is linked to a second three-way valve 518 that linked to the reservoir 504 of thermostatic fluid and the heat exchanger 506. The second three-way valve 518 is configured to fill the reservoir 504 of thermostatic fluid or the insulated reaction chamber of the the photoreactor 502.

In an embodiment, the inlet 510 is linked to the heat exchanger 506 through a flow control device 520.

In operation, the first three-way valve 514 and the second three-way valve 518 are set to circulate thermostatic fluid from and to the insulated reaction chamber of the the photoreactor 502.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method for performing one or more simultaneous and independent photochemical reactions, the method comprising the steps of:
   (1) obtaining a device comprising:
      an insulated reaction chamber;
      modular side light sources above a stirring module, the modular side light sources configured in a series to surround the reaction chamber, each modular side light source configurable to have one or more opaque separation walls separating its light from light from each other modular side light source, and a type and a number of reaction vessels inserted into the reaction chamber, with an optional modular bottom light source underneath said reaction vessels;
      wherein each modular light source is capable of having a different wavelength, enabling different wavelengths in the reaction chamber using the one or more separation walls;
      wherein each modular light source comprises a plurality of light sources;
      wherein each of the plurality of light sources is independently controllable to allow a homogeneous exposure to the light and/or to adapt to the type and the number of reaction vessels inserted into the reaction chamber;
      a plurality of holders containing the reaction vessels, the plurality of holders configured to fit within the insulated reaction chamber in a manner that enables an even distribution of light between the reaction vessels;
   (2) placing one or more chemicals in one or more of the reaction vessels, inserted into the holders in the reaction chamber; and
   (3) controlling each of the light sources independently, whereby an independent photochemical reaction is facilitated in one or more of the reaction vessels, and wherein the method with the device limits or prevents one or more unwanted factors from affecting a photochemical reaction therein.

2. The method of claim 1, wherein the insulated reaction chamber includes a thermostated fluid, and wherein the method at step (3) further comprises controlling a temperature of the thermostated fluid.

3. The method of claim 1, wherein the stirring module is a magnetic stirring module, and wherein step (3) further comprises controlling a stirring in one or more reaction vessels.

4. The method of claim 1, wherein the insulated reaction chamber is transparent to ultraviolet (UV) light.

5. The method of claim 1, wherein the insulated reaction chamber is transparent to visible light.

6. The method of claim 1, wherein each of the plurality of light sources is independently controllable.

7. The method of claim 1, wherein each of the plurality of light sources comprises a specific light spectrum centered to a main wavelength.

8. The method of claim 1, wherein each of the reaction vessels comprises a cap configured to impeach light to leak from the reaction chamber while enabling reaction sampling.

9. The method of claim 1, wherein each of the reaction vessels comprises a cap configured to impeach light to leak from the reaction chamber while enabling reaction sampling;
   wherein the cap comprises: a top portion having a central circular membrane;
   an inner wall; and an outer wall.

10. The method of claim 1, wherein each of the reaction vessels comprises a cap configured to impeach light to leak from the reaction chamber while enabling reaction sampling;
    wherein the cap comprises: a top portion having a central circular membrane;
    an inner wall; an outer wall; and
    wherein the inner wall is configured to secure directly to the reaction vessel.

11. The method of claim 10, wherein the outer wall is configured to lean on the holder and block light leakage.

12. A method for performing one or more simultaneous and independent photochemical reactions including a control of a reaction temperature, the method comprising the steps of:
   (1) obtaining a device comprising:
      an insulated reaction chamber including a thermostated fluid;
      an inlet and an outlet to enable introduction of the thermostatic fluid into the insulated reaction chamber;
      a reservoir of thermostatic fluid;
      a heat exchanger;
      a heater/chiller unit, the reservoir of liquid linked to an inlet, an outlet, and to the heat exchanger, the heat exchanger linked to the heater/chiller unit;
      modular side light sources above a stirring module, the modular side light sources configured in a series to surround the reaction chamber, each modular side light source configurable to have one or more opaque separation walls separating its light from light from each other modular side light source, and a type and a number of reaction vessels inserted into the reaction chamber, with an optional modular bottom light source underneath said reaction vessels;
      wherein each modular light source is capable of having a different wavelength, enabling different wavelengths in the reaction chamber using the one or more separation walls;
      wherein each modular light source comprises a plurality of light sources;
      wherein each of the plurality of light sources is independently controllable to allow a homogeneous exposure to the light and/or to adapt to the type and the number of reaction vessels inserted into the reaction chamber;
      a plurality of holders containing the reaction vessels, the plurality of holders configured to fit within the insulated reaction chamber in a manner that enables an even distribution of light between the reaction vessels;
   (2) placing one or more chemicals in one or more of the reaction vessels, inserted into the holders in the reaction chamber;
   (3) controlling each of the light sources independently, whereby an independent photochemical reaction is facilitated in one or more of the reaction vessels, and wherein the method with the device limits or prevents one or more unwanted factors from affecting a photochemical reaction therein; and controlling a temperature of the thermostated fluid.

13. The method of claim 12, wherein the outlet is linked to a first three-way valve, the first three-way valve linked to a pump and the reservoir of thermostatic fluid, the first three-way valve configured to empty the reservoir of thermostatic fluid or the insulated reaction chamber.

14. The method of claim 13, wherein the pump is linked to a second three-way valve, the second three-way valve linked to the reservoir of thermostatic fluid and the heat exchanger, the second three-way valve configured to fill the reservoir of thermostatic fluid or the insulated reaction chamber.

15. The method of claim 14, wherein the inlet is linked to the heat exchanger through a flow control.

* * * * *